(12) United States Patent
Kwak et al.

(10) Patent No.: US 12,161,275 B2
(45) Date of Patent: Dec. 10, 2024

(54) PLURALITY OF AUTONOMOUS CLEANER AND CONTROLLING METHOD FOR THE SAME

(71) Applicant: LG ELECTRONICS INC., Seoul (KR)

(72) Inventors: Donghoon Kwak, Seoul (KR); Jaehwan Ko, Seoul (KR); Hyukdo Kweon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 873 days.

(21) Appl. No.: 17/255,103

(22) PCT Filed: May 30, 2019

(86) PCT No.: PCT/KR2019/006527
§ 371 (c)(1),
(2) Date: Dec. 22, 2020

(87) PCT Pub. No.: WO2020/004824
PCT Pub. Date: Jan. 2, 2020

(65) Prior Publication Data
US 2021/0259498 A1     Aug. 26, 2021

(30) Foreign Application Priority Data

Jun. 25, 2018   (KR) ........................ 10-2018-0072980

(51) Int. Cl.
*A47L 11/40*     (2006.01)
*G05D 1/00*     (2024.01)
(52) U.S. Cl.
CPC ........ *A47L 11/4011* (2013.01); *G05D 1/0219* (2013.01); *G05D 1/028* (2013.01);
(Continued)

(58) Field of Classification Search
CPC ............. A47L 11/4011; A47L 2201/04; A47L 2201/06; A47L 9/2857; A47L 9/2894;
(Continued)

(56) References Cited

U.S. PATENT DOCUMENTS

2002/0095239 A1*   7/2002   Wallach ............... G05D 1/0295
700/245
2016/0320774 A1*   11/2016   Kuhara ................ G05D 1/0289
(Continued)

FOREIGN PATENT DOCUMENTS

JP    2003-180587 A    7/2003
JP    3986310 B2    10/2007
(Continued)

OTHER PUBLICATIONS

Multimobile Robot Cooperative Localization Using Ultrawideband Sensor (Year: 2022).*
(Continued)

*Primary Examiner* — Kyle T Johnson
(74) *Attorney, Agent, or Firm* — Birch, Stewart, Kolasch & Birch, LLP

(57) ABSTRACT

The present disclosure relates to a plurality of autonomous cleaners. A first cleaner of the plurality of autonomous cleaners according to one embodiment of the present disclosure includes a traveling unit to move a main body thereof, a communication unit to perform communication with a second cleaner, and a control unit to determine a position of the second cleaner using an Ultra-WideBand (UWB) signal output from the communication unit, and set area information, in which the first and second cleaners are to perform cleaning, based on a position of the first cleaner and the position of the second cleaner, wherein the control
(Continued)

unit controls the second cleaner based on second area information in which the second cleaner is to perform cleaning.

8 Claims, 10 Drawing Sheets

(52) U.S. Cl.
CPC ........ *G05D 1/0287* (2013.01); *A47L 2201/04* (2013.01); *A47L 2201/06* (2013.01)

(58) Field of Classification Search
CPC ........ B25J 9/1664; B25J 9/1682; B25J 19/02; G05D 1/0219; G05D 1/028; G05D 1/0287; G05D 1/0295; G05D 1/0276; G05D 2201/0203
See application file for complete search history.

(56) References Cited

U.S. PATENT DOCUMENTS

| | | | |
|---|---|---|---|
| 2017/0000307 A1 | 1/2017 | Choi et al. | |
| 2017/0146994 A9* | 5/2017 | Ammar | A47L 11/4061 |
| 2018/0157266 A1* | 6/2018 | Xie | G05D 1/0285 |
| 2018/0344114 A1* | 12/2018 | Scholten | G05D 1/0291 |
| 2019/0212752 A1* | 7/2019 | Fong | G06V 10/82 |
| 2020/0050215 A1* | 2/2020 | Kessler | A47L 11/4011 |
| 2020/0230806 A1* | 7/2020 | Choi | B25J 5/007 |
| 2021/0259498 A1* | 8/2021 | Kwak | A47L 11/4011 |

FOREIGN PATENT DOCUMENTS

| | | | | |
|---|---|---|---|---|
| JP | 2010-108433 A | | 5/2010 | |
| JP | 4839253 B2 | | 2/2011 | |
| JP | 5735940 B2 | | 6/2015 | |
| JP | 2015-147091 A | | 8/2015 | |
| JP | 2017-042217 A | | 3/2017 | |
| KR | 10-2012-0126772 A | | 11/2012 | |
| KR | 10-2015-0047893 A | | 5/2015 | |
| KR | 10-2015-0061398 A | | 6/2015 | |
| KR | 20160059473 A | * | 5/2016 | |
| KR | 10-2017-0140561 A | | 12/2017 | |
| KR | 10-2018-0039437 A | | 4/2018 | |
| KR | 20200035391 A | * | 4/2020 | |
| WO | WO-2020004824 A1 | * | 1/2020 | A47L 11/4011 |

OTHER PUBLICATIONS

KR-20160059473-A translation (Year: 2018).*
KR-20200035391-A translation (Year: 2020).*
PCT International Search Report and Written Opinion, dated Sep. 10, 2019, issued in International Patent Application No. PCT/KR2019/006527 (10 pages).

* cited by examiner (a)

(b)

PLURALITY OF AUTONOMOUS CLEANER AND CONTROLLING METHOD FOR THE SAME

CROSS-REFERENCE TO RELATED APPLICATIONS

This application is the National Stage filing under 35 U.S.C. 371 of International Application No. PCT/KR2019/006527, filed on May 30, 2019, which claims the benefit of earlier filing date and right of priority to Korean Application No. 10-2018-0072980 filed on Jun. 25, 2018, the contents of all of which are hereby incorporated by reference herein in their entirety.

TECHNICAL FIELD

The present disclosure relates to a plurality of autonomous cleaners.

BACKGROUND

A cleaner is a device that performs cleaning by sucking or mopping dust or foreign materials. Generally, the cleaner performs a cleaning function for a floor, and includes wheels for movement. Generally, the wheels are rolled by external force applied to the cleaner main body to move the cleaner main body relative to the floor.

In recent years, however, there have been actively studied on autonomous cleaners, such as a robot cleaner that performs cleaning while traveling by itself without a user's manipulation, a cleaner that moves by itself along a nozzle moved by the user's manipulation, and the like.

With the development of such robot cleaners performing cleaning while traveling by themselves without users' operations, necessity to make a plurality of robot cleaners perform cleaning in a collaborating manner without users' operations is emerging as an interest.

Technical Problem

One aspect of the present disclosure is to provide a plurality of robot cleaners, capable of performing cleaning in an optimized manner without user's intervention, and a control method thereof.

Another aspect of the present disclosure is to provide a plurality of robot cleaners, capable of collaboratively cleaning divided areas in an optimized manner, and a control method thereof.

Still another aspect of the present disclosure is to provide a plurality of robot cleaners, capable of collaboratively cleaning different regions in an optimized manner without sharing maps corresponding to places that they are cleaning, and a control method thereof.

Technical Solution

To achieve those aspects and other advantages of the present disclosure, there is provided an autonomous cleaner, as a first cleaner of a plurality of autonomous cleaners, including a traveling unit to move a main body, a communication unit to perform communication with a second cleaner, and a control unit to determine a position of the second cleaner using an Ultra-WideBand (UWB) signal output from the communication unit, and set area information, in which the first and second cleaners are to perform cleaning, based on a position of the first cleaner and the position of the second cleaner, wherein the control unit controls the second cleaner based on second area information in which the second cleaner is to perform cleaning.

In an embodiment, the control unit may control the communication unit so that the first cleaner performs cleaning in an area corresponding to first area information, in which the first cleaner is to perform cleaning, and the second cleaner performs cleaning in an area corresponding to the second area information.

In an embodiment, the control unit may control the first cleaner to perform cleaning within the area corresponding to the first area information while maintaining a preset distance between the first cleaner and the second cleaner.

In an embodiment, the control unit may receive information related to cleaning performed by the second cleaner using the UWB signal, and update the area information based on the received information.

In an embodiment, the control unit may sense a traveling path of the second cleaner using the UWB signal, and reflect the sensed traveling path of the second cleaner in the second area information.

In an embodiment, the control unit may receive information on whether or not cleaning can be continued, from the second cleaner through the communication unit, when the second cleaner has completed the cleaning of the area corresponding to the second area information along the sensed traveling path of the second cleaner.

In an embodiment, the control unit may change the area information when the information that cleaning can be continued is received from the second cleaner, and continue the cleaning of the second cleaner based on the changed area information.

In an embodiment, the control unit may determine whether or not the first cleaner has completed the cleaning for the area corresponding to the first area information when information that cleaning cannot be continued is received from the second cleaner after the second cleaner has completed the cleaning for the area corresponding to the second area information.

In an embodiment, the control unit may control the second cleaner to wait when the first cleaner is cleaning the area corresponding to the first area information.

In an embodiment, the control unit may set new area information not to overlap existing area information when the first cleaner has completed the cleaning for the area corresponding to the first area information and the second cleaner has completed the cleaning for the area corresponding to the second area information.

Advantageous Effects

According to the present disclosure, in case of cleaning divided areas using a plurality of autonomous cleaners, a first cleaner can perform cleaning by controlling a second cleaner even without sharing a map. Therefore, collaborative cleaning using the plurality of autonomous cleaners can be performed even though the plurality of autonomous cleaners is different in specification.

According to the present disclosure, a first cleaner, of a plurality of autonomous cleaners, can update map information (or area information in which each cleaner is to perform cleaning) by recognizing or determining a relative position of a second cleaner and a cleaning state of the second cleaner, and can control the second cleaner by using the updated map information. Therefore, optimized collabora-

DETAILED DESCRIPTION

Hereinafter, an autonomous cleaner according to the present disclosure will be described in detail with reference to the accompanying drawings.

Hereinafter, description will be given in detail of embodiments disclosed herein.

Technical terms used in this specification are merely used for explaining specific embodiments, and should not be constructed to limit the scope of the technology disclosed herein.

Figure 1:
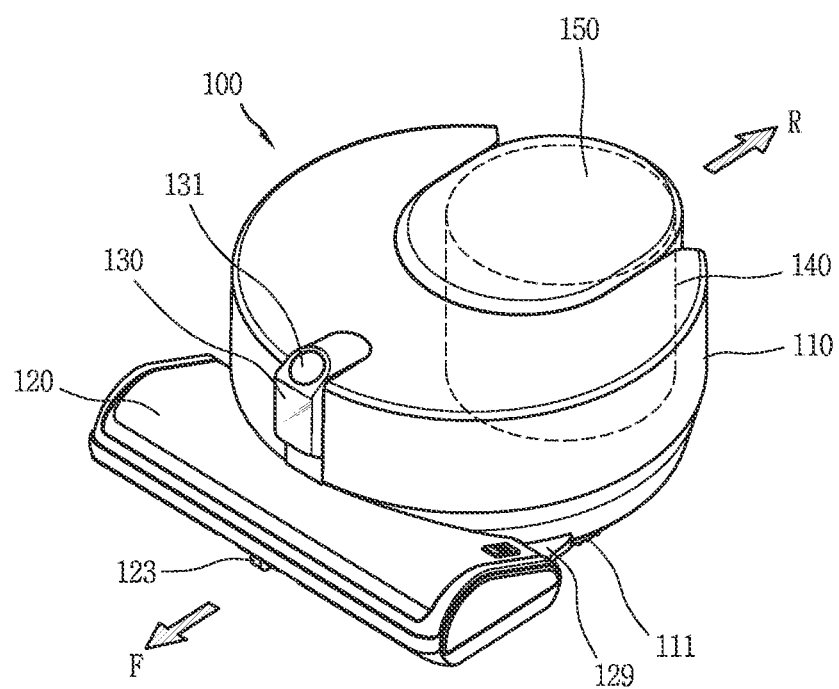
FIG. 1 is a perspective view illustrating one embodiment of an autonomous cleaner according to the present disclosure.
Figure 2:
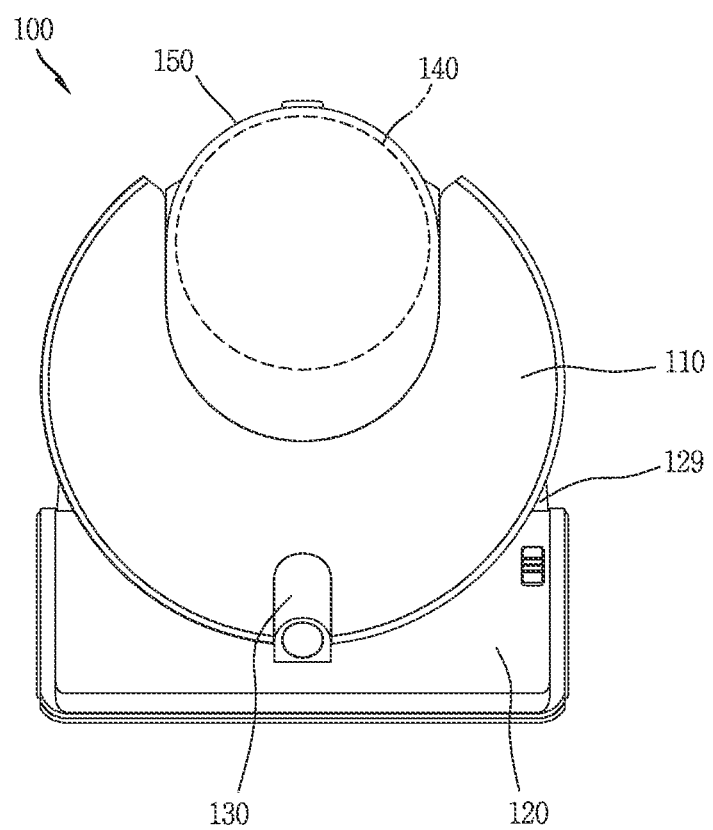
FIG. 2 is a planar view of the autonomous cleaner illustrated in FIG. 1.
Figure 3:
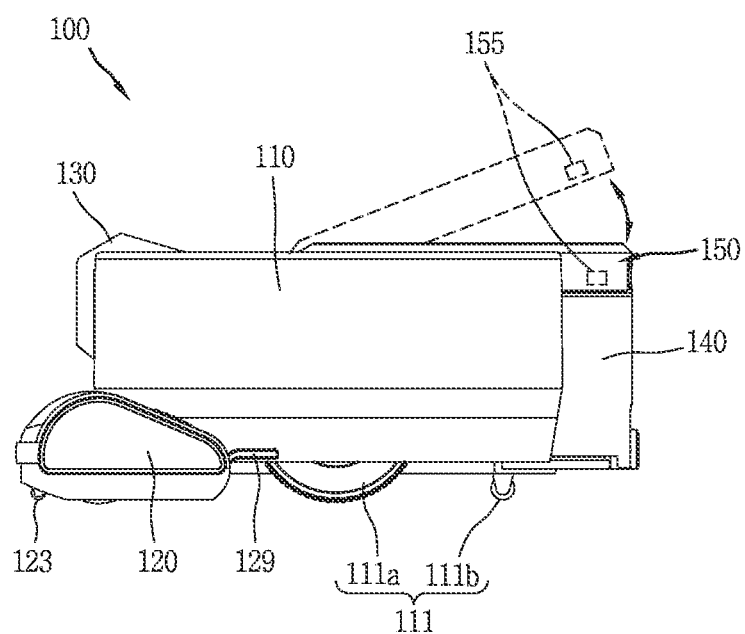
FIG. 3 is a lateral view of the autonomous cleaner illustrated in FIG. 1.

FIG. 1 is a perspective view illustrating one embodiment of an autonomous cleaner 100 according to the present disclosure, FIG. 2 is a front view of the autonomous cleaner 100 illustrated in FIG. 1, and FIG. 3 is a lateral view of the autonomous cleaner 100 illustrated in FIG. 1.

In this specification, a mobile robot, an autonomous cleaner, and a cleaner that performs autonomous traveling may be used in the same sense. In this specification, a plurality of autonomous cleaners may include at least part of configurations illustrated in FIGS. 1 to 3.

Referring to FIGS. 1 to 3, an autonomous cleaner 100 performs a function of cleaning a floor while traveling on a predetermined area by itself. Cleaning the floor disclosed herein includes sucking dust (including foreign materials) on the floor or mopping the floor.

The autonomous cleaner 100 may include a cleaner main body 110, a cleaning unit 120, a sensing unit 130, and a dust bin 140.

The cleaner main body 110 is provided with various components in addition to a controller or control unit (not illustrated) for controlling the autonomous cleaner 100. In addition, the cleaner main body 110 is provided with a wheel unit 111 for traveling the autonomous cleaner 100. The autonomous cleaner 100 may be moved or rotated forward, backward, left or right by the wheel unit 111.

Referring to FIG. 3, the wheel unit 111 includes main wheels 111a and a sub wheel 111b.

The main wheels 111a are provided on both sides of the cleaner main body 110 and configured to be rotatable in one direction or another direction according to a control signal of the control unit. Each of the main wheels 111a may be configured to be driven independently of each other. For example, each main wheel 111a may be driven by a different motor. Or each main wheel 111a may be driven by a plurality of different axes provided in one motor.

The sub wheel 111b supports the cleaner main body 110 together with the main wheels 111a and assists the traveling of the autonomous cleaner 100 by the main wheels 111a. The sub wheel 111b may also be provided on a cleaning unit 120 to be described later.

The control unit controls the driving of the wheel unit 111, so that the autonomous cleaner 100 is allowed to autonomously run the floor.

Meanwhile, the cleaner main body 110 is provided with a battery (not shown) for supplying power to the autonomous cleaner 100. The battery 190 may be configured to be rechargeable, and may be detachably disposed in a bottom portion of the cleaner main body 110.

In FIG. 1, a cleaning unit 120 may be disposed in a protruding form from one side of the cleaner main body 110, so as to suck air containing dust or mop an area. The one side may be a side where the cleaner main body 110 travels in a forward direction F, that is, a front side of the cleaner main body 110.

In this drawing, the cleaning unit 120 is shown having a shape protruding from one side of the cleaner main body 110 to front and both left and right sides. Specifically, a front end portion of the cleaning unit 120 is disposed at a position spaced forward apart from the one side of the cleaner main body 110, and left and right end portions of the cleaning unit 120 are disposed at positions spaced apart from the one side of the cleaner main body 110 in the right and left directions.

As the cleaner main body 110 is formed in a circular shape and both sides of a rear end portion of the cleaning unit 120 protrude from the cleaner main body 110 to both left and right sides, empty spaces, namely, gaps may be formed between the cleaner main body 110 and the cleaning unit 120. The empty spaces are spaces between both left and right end portions of the cleaner main body 110 and both left and right end portions of the cleaning unit 120 and each has a shape recessed into the autonomous cleaner 100.

If an obstacle is caught in the empty space, the autonomous cleaner 100 may be likely to be unmovable due to the obstacle. To prevent this, a cover member 129 may be disposed to cover at least part of the empty space.

The cover member 129 may be provided on the cleaner main body 110 or the cleaning unit 120. In an embodiment of the present disclosure, the cover member 129 protrude from each of both sides of the rear end portion of the cleaning unit 120 and covers an outer circumferential surface of the cleaner main body 110.

The cover member 129 is disposed to fill at least part of the empty space, that is, the empty space between the cleaner main body 110 and the cleaning unit 120. This may result in realizing a structure capable of preventing an obstacle from being caught in the empty space, or to easily escape an obstacle even if the obstacle is caught in the empty space.

The cover member 129 protruding from the cleaning unit 120 may be supported on the outer circumferential surface of the cleaner main body 110.

The cover member 129 may be supported on a rear portion of the cleaning unit if the cover member 129 protrudes from the cleaner main body 110. According to this structure, when the cleaning unit 120 is impacted due to colliding with an obstacle, a part of the impact is transferred to the cleaner main body 110 so as to be dispersed.

The cleaning unit 120 may be detachably coupled to the cleaner main body 110. When the cleaning unit 120 is detached from the cleaner main body 110, a mop module (not shown) may be detachably coupled to the cleaner main body 110 in place of the detached cleaning unit 120.

Accordingly, the user can mount the cleaning unit 120 on the cleaner main body when the user wishes to remove dust on the floor, and may mount the mop module on the cleaner main body 110 when the user wants to mop the floor.

When the cleaning unit 120 is mounted on the cleaner main body 110, the mounting may be guided by the cover member 129 described above. That is, as the cover member 129 is disposed to cover the outer circumferential surface of the cleaner main body 110, a relative position of the cleaning unit 120 with respect to the cleaner main body 110 may be determined.

The cleaning unit 120 may be provided with a castor 123. The caster 123 assists the running of the autonomous cleaner 100 and also supports the autonomous mobile robot 100.

The cleaner main body 110 is provided with a sensing unit 130. As illustrated, the sensing unit 130 may be disposed on one side of the cleaner main body 110 where the cleaning unit 120 is located, that is, on a front side of the cleaner main body 110.

The sensing unit 130 may be disposed to overlap the cleaning unit 120 in an up and down direction of the cleaner main body 110. The sensing unit 130 is disposed at an upper portion of the cleaning unit 120 so as to detect an obstacle or feature in front of the robot so that the cleaning unit 120 positioned at the forefront of the autonomous cleaner 100 does not hit the obstacle.

The sensing unit 130 may be configured to additionally perform another sensing function other than the sensing function.

By way of example, the sensing unit 130 may include a camera 131 for acquiring surrounding images. The camera 131 may include a lens and an image sensor. The camera 131 may convert a surrounding image of the cleaner main body into an electrical signal that can be processed by the control unit. For example, the camera 131 may transmit an electrical signal corresponding to an upward image to the control unit. The electrical signal corresponding to the upward image may be used by the control unit to detect the position of the cleaner main body 110.

In addition, the sensing unit 130 may detect obstacles such as walls, furniture, and cliffs on a traveling surface or a traveling path of the autonomous cleaner 100. Also, the sensing unit 130 may sense presence of a docking device that performs battery charging. Also, the sensing unit 130 may detect ceiling information so as to map a traveling area or a cleaning area of the autonomous cleaner 100.

The cleaner main body 110 is provided with a dust container 140 detachably coupled thereto for separating and collecting dust from sucked air.

The dust container 140 is provided with a dust container cover 150 which covers the dust container 140. In an embodiment, the dust container cover 150 may be coupled to the cleaner main body 110 by a hinge to be rotatable. The dust container cover 150 may be fixed to the dust container 140 or the cleaner main body 110 to keep covering an upper surface of the dust container 140. The dust container 140 may be prevented from being separated from the cleaner main body 110 by the dust container cover 150 when the dust container cover 150 is disposed to cover the upper surface of the dust container 140.

A part of the dust container 140 may be accommodated in a dust container accommodating portion and another part of the dust container 140 protrudes toward the rear of the cleaner main body 110 (i.e., a reverse direction R opposite to a forward direction F).

The dust container 140 is provided with an inlet through which air containing dust is introduced and an outlet through which air separated from dust is discharged. The inlet and the outlet communicate with each other through an opening 155 formed through an inner wall of the cleaner main body 110 when the dust container 140 is mounted on the cleaner main body 110. Thus, an intake passage and an exhaust passage inside the cleaner main body 110 may be formed.

According to such connection, air containing dust introduced through the cleaning unit 120 flows into the dust container 140 through the intake passage inside the cleaner main body 110 and the air is separated from the dust while passing through a filter and cyclone of the dust container 140. The separated dust is collected in the dust container 140, and the air is discharged from the dust container 140 and flows along the exhaust passage inside the cleaner main body 110 so as to be externally exhausted through an exhaust port.

Figure 4:
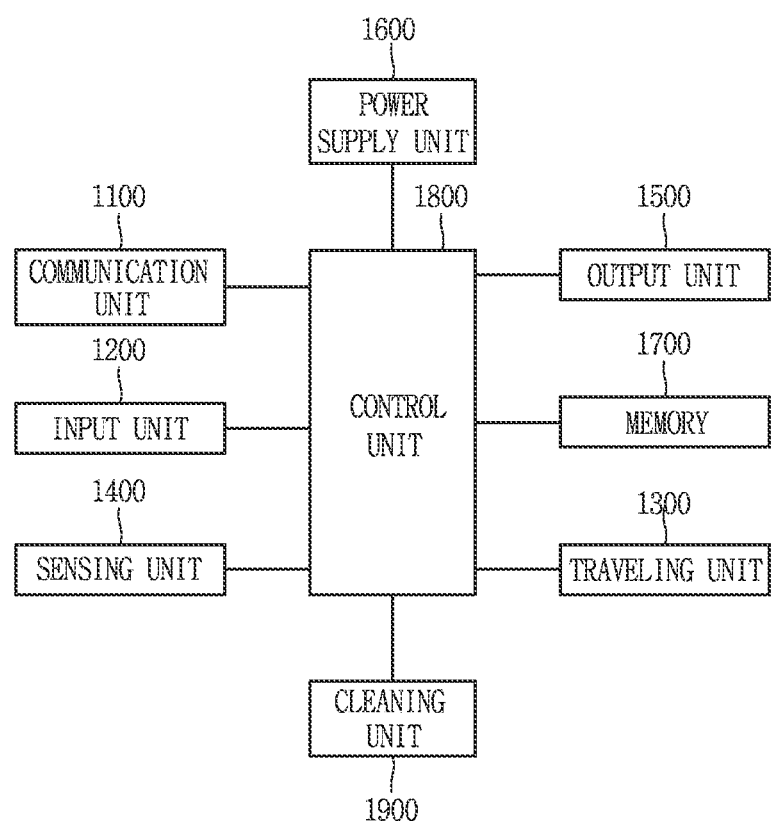
FIG. 4 is a block diagram illustrating exemplary components of an autonomous cleaner according to one embodiment of the present disclosure.

Hereinafter, an embodiment related to the components of the autonomous cleaner 100 will be described with reference to FIG. 4.

An autonomous cleaner 100 or a mobile robot according to an embodiment of the present disclosure may include a communication unit 1100, an input unit 1200, a traveling unit 1300, a sensing unit 1400, an output unit 1500, a power supply unit 1600, a memory 1700, a control unit 1800, and a cleaning unit 1900, or a combination thereof. At this time, those components shown in FIG. 4 are not essential, and an autonomous cleaner having greater or fewer components can be implemented. Also, as described above, each of a plurality of autonomous cleaners described in the present disclosure may equally include only some of components to be described below. That is, a plurality of autonomous cleaners may include different components.

Hereinafter, each component will be described.

First, the power supply unit 1600 includes a battery that can be charged by an external commercial power supply, and supplies power to the mobile robot. The power supply unit 1600 supplies driving force to each of the components included in the mobile robot to supply operating power required for the mobile robot to travel or perform a specific function.

At this time, the control unit 1800 may detect a remaining amount of power (or remaining power level or battery level) of the battery. The control unit 1800 may control the mobile robot to move to a charging base connected to the external commercial power supply when the remaining power is insufficient, so that the battery can be charged by receiving charging current from the charging base. The battery may be connected to a battery sensing portion so that a remaining power level and a charging state can be transmitted to the control unit 1800. The output unit 1500 may display the remaining battery level under the control of the control unit.

The battery may be located in a bottom portion of a center of the autonomous cleaner, or may be located in either the left or right side. In the latter case, the mobile robot may further include a balance weight to eliminate weight bias of the battery.

The control unit 1800 performs processing of information based on an artificial intelligence (AI) technology and may include one or more modules that perform at least one of learning of information, inference of information, perception of information, and processing of natural language.

The control unit 1800 may use a machine running technology to perform at least one of learning, inferring and processing a large amount of information (big data), such as information stored in the cleaner, environmental information around a mobile terminal, information stored in an external storage capable of performing communication, and the like. The control unit 1800 may control the cleaner to predict (or infer) at least one executable operation and execute an operation having the highest feasibility among the predicted at least one operation, by using the information learned using the machine running technology.

Machine learning technology is a technology that collects and learns a large amount of information based on at least one algorithm, and judges and predicts information based on the learned information. The learning of information is an operation that grasps characteristics, rules, and judgment criteria of information, quantifies relationship between information and information, and predicts new data using a quantified pattern.

The at least one algorithm used by the machine learning technology may be a statistical based algorithm, for example, a decision tree that uses a tree structure type as a prediction model, an artificial neural network copying neural network architecture and functions, genetic programming based on biological evolutionary algorithms, clustering to distribute observed examples into subsets of clusters, Monte Carlo method to compute function values through randomly extracted random numbers from probability, or the like.

As a field of machine learning technology, deep learning is a technique that performs at least one of learning, judging, and processing of information using an Artificial Neural Network (ANN) or a Deep Neuron Network (DNN) algorithm. Such DNN may have an architecture in which layers are connected to transfer data between layers. This deep learning technology may allow learning of a large amount of information through the DNN using a graphic processing unit (GPU) optimized for parallel computing.

The control unit 1800 may use training data stored in an external server or memory, and may include a learning engine mounted to detect characteristics for recognizing a predetermined object. At this time, the characteristics for recognizing the object may include a size, shape and shade of the object.

Specifically, when the control unit 1800 inputs a part of images acquired through the camera provided on the cleaner into the learning engine, the learning engine may recognize at least one object or organism included in the input images.

When the learning engine is applied to traveling of the cleaner, the control unit can recognize whether or not an obstacle such as a chair leg, a fan, and a specific shape of balcony gap, which obstruct the running of the cleaner, exists around the cleaner. This may result in enhancing efficiency and reliability of the traveling of the cleaner.

On the other hand, the learning engine may be mounted on the control unit 1800 or on an external server. When the learning engine is mounted on an external server, the control unit 1800 may control the communication unit 1100 to transmit at least one image to be analyzed, to the external server.

The external server may input the image transmitted from the cleaner into the learning engine and thus recognize at least one object or organism included in the image. In addition, the external server may transmit information related to the recognition result back to the cleaner. In this case, the information related to the recognition result may include information related to the number of objects included in the image to be analyzed and a name of each object.

On the other hand, the traveling unit 1300 may include a motor, and operate the motor to bidirectionally rotate left and right main wheels, so that the main body can rotate or move. At this time, the left and right main wheels may be independently moved. The traveling unit 1300 may advance the main body of the mobile robot forward, backward, left, right, curvedly, or in place.

On the other hand, the input unit 1200 receives various control commands for the autonomous cleaner from the user. The input unit 1200 may include one or more buttons, for example, the input unit 1200 may include an OK button, a setting button, and the like. The OK button is a button for receiving a command for confirming detection information, obstacle information, position information, and map information from the user, and the setting button is a button for receiving a command for setting those information from the user.

In addition, the input unit 1200 may include an input reset button for canceling a previous user input and receiving a new user input, a delete button for deleting a preset user input, a button for setting or changing an operation mode, a button for receiving an input to return to the charging base.

In addition, the input unit 1200 may be implemented as a hard key, a soft key, a touch pad, or the like and may be disposed on a top of the mobile robot. For example, the input unit 1200 may implement a form of a touch screen together with the output unit 1500.

On the other hand, the output unit 1500 may be installed on a top of the mobile robot. Of course, an installation location and an installation type may vary. For example, the output unit 1500 may display a battery level state, a traveling mode or manner, or the like on a screen.

The output unit 1500 may output internal status information of the mobile robot detected by the sensing unit 1400, for example, a current status of each component included in the mobile robot. The output unit 1500 may also display external status information detected by the sensing unit 1400, obstacle information, position information, map information, and the like on the screen. The output unit 1500 may be configured as one device of a light emitting diode (LED), a liquid crystal display (LCD), a plasma display panel, and an organic light emitting diode (OLED).

The output unit 1500 may further include an audio output module for audibly outputting information related to an operation of the mobile robot executed by the control unit 1800 or an operation result. For example, the output unit 1500 may output warning sound to the outside in response to a warning signal generated by the control unit 1800.

In this case, the audio output module (not shown) may be means, such as a beeper, a speaker or the like for outputting sounds, and the output unit 1500 may output sounds to the outside through the audio output module using audio data or message data having a predetermined pattern stored in the memory 1700.

Accordingly, the mobile robot according to an embodiment of the present disclosure can output environmental information related to a traveling area through the output unit 1500 or output the same in an audible manner. According to another embodiment, the mobile robot may transmit map information or environmental information to a terminal device through the communication unit 1100 so that the terminal device outputs a screen to be output through the output unit 1500 or sounds.

The memory 1700 stores a control program for controlling or driving the autonomous cleaner and data corresponding thereto. The memory 1700 may store audio information, image information, obstacle information, position information, map information, and the like. Also, the memory 1700 may store information related to a traveling pattern.

The memory 1700 mainly uses a nonvolatile memory. Here, the non-volatile memory (NVM, NVRAM) is a storage device that can continuously store information even when power is not supplied. Examples of the storage device include a ROM, a flash memory, a magnetic computer storage device (e.g., a hard disk, a diskette drive, a magnetic tape), an optical disk drive, a magnetic RAM, a PRAM, and the like.

On the other hand, the sensing unit 1400 may include at least one of an external signal sensor, a front sensor, a cliff sensor, a two-dimensional (2D) camera sensor, and a three-dimensional (3D) camera sensor.

The external signal sensor or external signal detection sensor may sense an external signal of a mobile robot. The external signal sensor may be, for example, an infrared ray (IR) sensor, an ultrasonic sensor, a radio frequency (RF) sensor, or the like.

The mobile robot may detect a position and direction of the charging base by receiving a guidance signal generated by the charging base using the external signal sensor. At this time, the charging base may transmit a guidance signal indicating a direction and distance so that the mobile robot can return thereto. That is, the mobile robot may determine a current position and set a moving direction by receiving a signal transmitted from the charging base, thereby returning to the charging base.

On the other hand, the front sensors or front detection sensors may be installed at a predetermined distance on the front of the mobile robot, specifically, along a circumferential surface of a side surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the control unit 1800. That is, the front sensor may detect protrusions on the moving path of the mobile robot, household appliances, furniture, walls, wall corners, and the like, and transmit the information to the control unit 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

An ultrasonic sensor, for example, may generally be used to detect a remote obstacle. The ultrasonic sensor may be provided with a transmitter and a receiver. The control unit 1800 may determine presence or non-presence of an obstacle according to whether ultrasonic waves radiated from the transmitter are reflected by an obstacle or the like and then received by the receiver, and calculate a distance from the obstacle using an ultrasonic wave radiation time and an ultrasonic wave reception time.

Also, the control unit 1800 may detect information related to a size of an obstacle by comparing ultrasonic waves radiated from the transmitter with ultrasonic waves received by the receiver. For example, the control unit 1800 may determine that the obstacle is larger in size when more ultrasonic waves are received in the receiver.

In one embodiment, a plurality (e.g., five) of ultrasonic sensors may be installed on side surfaces of the mobile robot at the front side along an outer circumferential surface. At this time, the ultrasonic sensors may preferably be installed on the front surface of the mobile robot in a manner that the transmitter and the receiver are alternately arranged.

That is, the transmitters may be disposed at right and left sides with being spaced apart from a front center of the main body or one transmitter or at least two transmitters may be disposed between the receivers so as to form a reception area of an ultrasonic signal reflected from an obstacle or the like. With this arrangement, the reception area can increase while reducing the number of sensors. A radiation angle of ultrasonic waves may be maintained in a range of avoiding an affection to different signals so as to prevent a crosstalk. Also, receiving sensitivity of the receivers may be set differently.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front sensor may include an IR sensor as another sensor, in addition to the ultrasonic sensor.

The IR sensor may be installed on an outer circumferential surface of the mobile robot together with the ultrasonic sensor. The IR sensor may also detect an obstacle existing on a front or side of the mobile robot and transmit obstacle information to the control unit 1800. That is, the IR sensor senses a protrusion, a household fixture, furniture, a wall, a wall edge, and the like, existing on the moving path of the mobile robot, and transmits detection information to the control unit 1800. Therefore, the mobile robot can move within a specific area without collision with an obstacle.

On the other hand, a cliff sensor (or cliff detection sensor) may detect an obstacle on the floor supporting the main body of the mobile robot by mainly using various types of optical sensors.

That is, the cliff sensor may also be installed on a rear surface of the mobile robot on the floor, but may be installed on a different position depending on a type of the mobile robot. The cliff sensor is located on the rear surface of the mobile robot and detects an obstacle on the floor. The cliff sensor may be an IR sensor, an ultrasonic sensor, an RF sensor, a Position Sensitive Detector (PSD) sensor, and the like, which include a transmitter and a receiver, similar to the obstacle detection sensor.

For example, one of the cliff sensors may be installed on the front of the mobile robot, and two other cliff sensors may be installed relatively behind.

For example, the cliff sensor may be a PSD sensor, but may alternatively be configured by a plurality of different kinds of sensors.

The PSD sensor detects a short/long distance location of incident light at one p-n junction using semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. As a type of infrared sensor, the PSD sensor uses infrared rays. The PSD sensor emits infrared ray, and measures a distance by calculating an angle of the infrared ray reflected and returned from an obstacle.

That is, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The control unit 1800 may measure an infrared ray angle between a light signal of infrared ray emitted by the cliff detection sensor toward the ground and a reflection signal reflected and received from an obstacle, so as to detect a cliff and analyze a depth of the cliff.

Meanwhile, the control unit 1800 may determine whether to pass a cliff or not according to a ground state of the detected cliff by using the cliff detection sensor, and decide whether to pass the cliff or not according to the determination result. For example, the control unit 1800 determines presence or non-presence of a cliff and a depth of the cliff through the cliff sensor, and then allows the mobile robot to pass through the cliff only when a reflection signal is detected through the cliff sensor.

As another example, the control unit 1800 may also determine lifting of the mobile robot using the cliff sensor.

On the other hand, the two-dimensional camera sensor is provided on one surface of the mobile robot to acquire image information related to the surroundings of the main body during movement.

An optical flow sensor converts a lower image input from an image sensor provided in the sensor to generate image data of a predetermined format. The generated image data may be stored in the memory 1700.

Also, at least one light source may be installed adjacent to the optical flow sensor. The at least one light source emits light to a predetermined area of the floor, which is captured by the image sensor. That is, while the mobile robot moves in a specific area along the floor surface, a certain distance is maintained between the image sensor and the floor surface when the floor surface is flat. On the other hand, when the mobile robot moves on a floor surface which is not flat, the image sensor and the floor surface are spaced apart from each other by a predetermined distance due to an unevenness and an obstacle on the floor surface. At this time, the at least one light source may be controlled by the control unit 1800 to adjust an amount of light to be emitted. The light source may be a light emitting device, for example, a light emitting diode (LED), which is capable of adjusting an amount of light.

The control unit 1800 may detect a position of the mobile robot irrespective of slippage of the mobile robot, using the optical flow sensor. The control unit 1800 may compare and analyze image data captured by the optical flow sensor according to time to calculate a moving distance and a moving direction, and calculate a position of the mobile robot based on the calculated moving distance and moving direction. By using the image information regarding the lower side of the mobile robot captured by the image sensor, the control unit 1800 may perform correction that is robust against slippage with respect to the position of the mobile robot calculated by another member.

The three-dimensional (3D) camera sensor may be attached to one surface or a part of the main body of the mobile robot to generate 3D coordinate information related to surroundings of the main body.

That is, the 3D camera sensor may be a 3D depth camera that calculates a remote/near distance between the mobile robot and an object to be captured.

Specifically, the 3D camera sensor may capture 2D images related to surroundings of the main body, and generate a plurality of 3D coordinate information corresponding to the captured 2D images.

In one embodiment, the 3D camera sensor may be configured in a stereoscopic vision type which includes two or more cameras for acquiring 2D images, and merges at least two images acquired by the two or more cameras to generate a 3D coordinate information.

Specifically, the 3D camera sensor according to the embodiment may include a first pattern irradiating portion for downwardly irradiating light of a first pattern toward the front of the main body, a second pattern irradiating portion for upwardly irradiating light of a second pattern toward the front of the main body, and an image acquiring portion for acquiring a front image of the main body. Thus, the image acquiring portion may acquire an image of an area where the light of the first pattern and the light of the second pattern are incident.

In another embodiment, the 3D camera sensor may include an infrared pattern irradiating portion for irradiating an infrared pattern, in addition to a single camera, and capture a shape that the infrared pattern irradiated from the infrared pattern irradiating portion is projected onto an object to be captured, thereby measuring a distance between the 3D camera sensor and the object to be captured. The 3D camera sensor may be an IR type 3D camera sensor.

In another embodiment, the 3D camera sensor may include a light emitting portion for emitting light, in addition to a single camera. The 3D camera sensor may receive a part of laser light (or laser beam), which is emitted from the light emitting portion and reflected from an object to be captured, and analyze the received light, thereby measuring a distance between the 3D camera sensor and the object to be captured. The 3D camera sensor may be a time-of-flight (TOF) type 3D camera sensor.

Specifically, the laser of the 3D camera sensor is configured to irradiate a laser beam extending in at least one direction. In one example, the 3D camera sensor may be provided with first and second lasers. The first laser irradiates linear laser beams intersecting each other, and the second laser irradiates single linear laser beam. According to this, the lowermost laser is used to detect an obstacle on a bottom, the uppermost laser is used to detect an obstacle on a top, and an intermediate laser between the lowermost laser and the uppermost laser is used to detect an obstacle at a middle portion.

On the other hand, the communication unit 1100 is connected to a terminal device and/or another device (also referred to as "home appliance" herein) through one of wired, wireless and satellite communication methods, so as to transmit and receive signals and data.

The communication unit 1100 may transmit and receive data with another device located in a specific area. In this case, the another device may be any device if it can transmit and receive data through a network. For example, the another device may be an air conditioner, a heating device, an air purifier, a lamp, a TV, a vehicle, and the like. The another device may also be a device for controlling a door, a window, a water supply valve, a gas valve, or the like. The another device may also be a sensor for detecting temperature, humidity, air pressure, gas, or the like.

Further, the communication unit 1100 may communicate with another autonomous cleaner 100 located in a specific area or within a predetermined range.

Figure 5A:
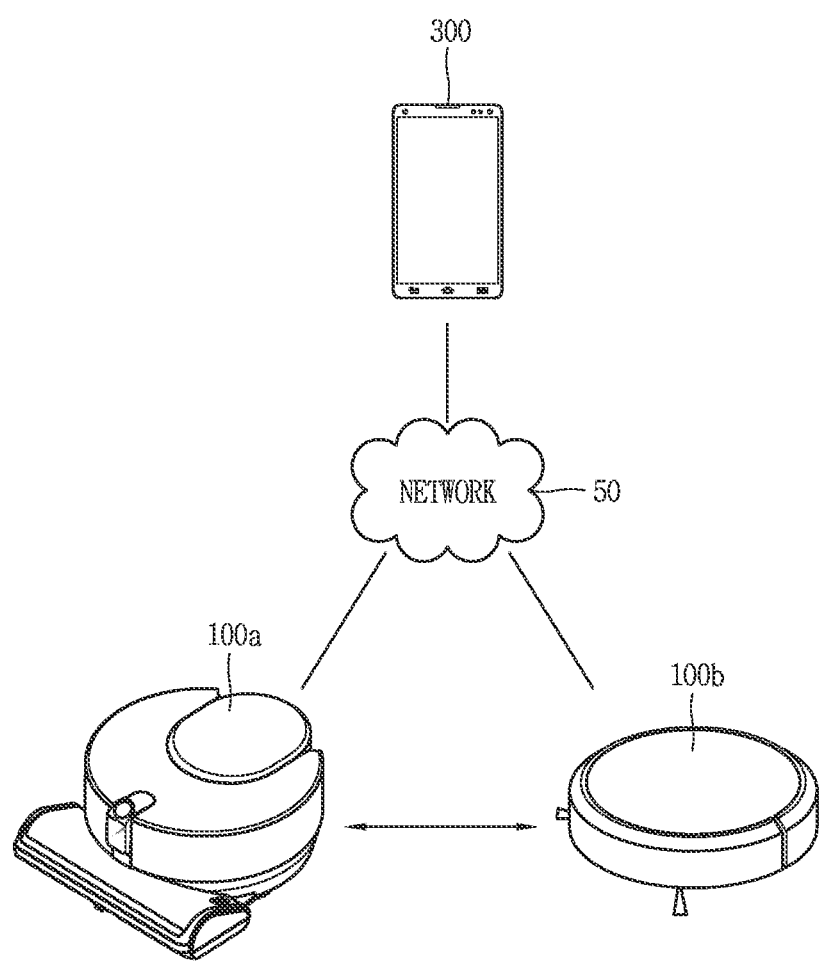
FIG. 5A is a conceptual view illustrating network communication between a plurality of autonomous cleaners according to one embodiment of the present disclosure.
Figure 5B:
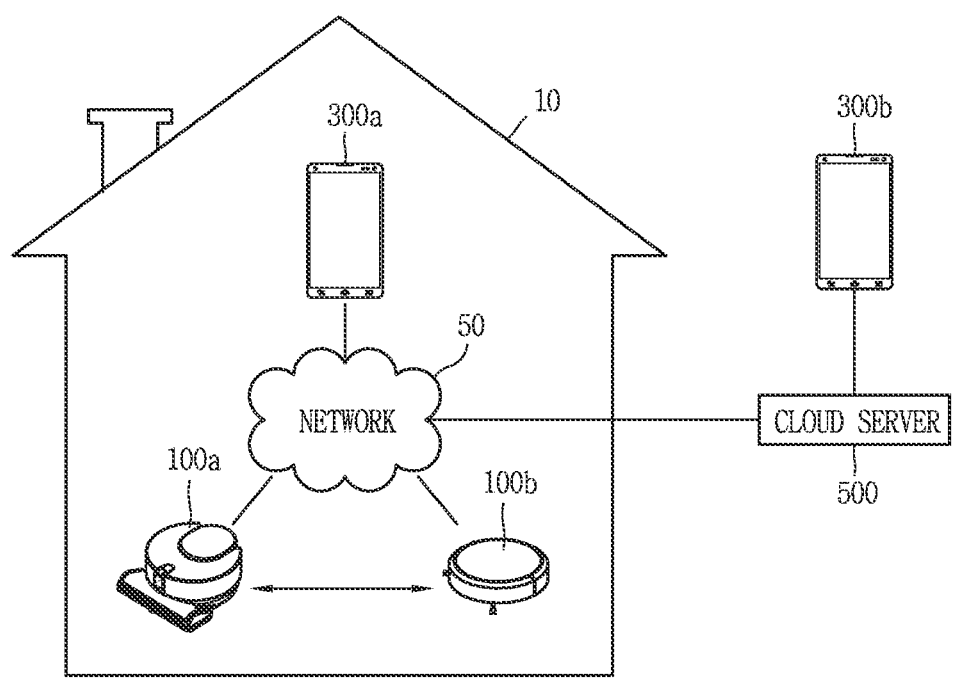
FIG. 5B is a conceptual view illustrating an example of the network communication of FIG. 5A.

Referring to FIGS. 5A and 5B, a first autonomous cleaner 100*a* and a second autonomous cleaner 100*b* may exchange data with each other through a network communication 50. In addition, the first autonomous cleaner 100*a* and/or the second autonomous cleaner 100*b* may perform a cleaning related operation or a corresponding operation by a control command received from a terminal 300 through the network communication 50 or other communication.

That is, although not shown, the plurality of autonomous cleaners 100*a* and 100*b* may perform communication with the terminal 300 through a first network communication and perform communication with each other through a second network communication.

Here, the network communication 50 may refer to short-range communication using at least one of wireless communication technologies, such as a wireless LAN (WLAN), a wireless personal area network (WPAN), a wireless fidelity (Wi-Fi) Wi-Fi direct, Digital Living Network Alliance (DLNA), Wireless Broadband (WiBro), World Interoperability for Microwave Access (WiMAX), ZIGBEE®, Z-WAVE®, BLUETOOTH®, Radio Frequency Identification (RFID), Infrared Data Association (IrDA), Ultrawide-Band (UWB), Wireless Universal Serial Bus (USB), and the like.

The network communication 50 may vary depending on a communication mode of the autonomous cleaners desired to communicate with each other.

In FIG. 5A, the first autonomous cleaner 100*a* and/or the second autonomous cleaner 100*b* may provide information sensed by the respective sensing units thereof to the terminal 300 through the network communication 50. The terminal 300 may also transmit a control command generated based on the received information to the first autonomous cleaner 100*a* and/or the second autonomous cleaner 100*b* via the network communication 50.

In FIG. 5A, the communication unit of the first autonomous cleaner 100*a* and the communication unit of the second autonomous cleaner 100*b* may also directly communicate with each other or indirectly communicate with each other via another router (not shown), to recognize information related to a traveling state and positions of counterparts.

In one example, the second autonomous cleaner 100*b* may perform a traveling operation and a cleaning operation according to a control command received from the first autonomous cleaner 100*a*. In this case, it may be said that the first autonomous cleaner 100*a* operates as a master cleaner and the second autonomous cleaner 100*b* operates as a slave cleaner. Alternatively, it can be said that the second autonomous cleaner 100*b* follows up the first autonomous cleaner 100*a*. In some cases, it may also be said that the first autonomous cleaner 100*a* and the second autonomous cleaner 100*b* collaborate with each other.

Hereinafter, a system including a plurality of cleaners 100*a* and 100*b* performing autonomous traveling according to an embodiment of the present disclosure will be described with reference to FIG. 5B.

As illustrated in FIG. 5B, a cleaning system according to an embodiment of the present disclosure may include a plurality of cleaners 100*a* and 100*b* performing autonomous traveling, a network 50, a server 500, and a plurality of terminals 300*a* and 300*b*.

The plurality of cleaners 100*a* and 100*b*, the network 50 and at least one terminal 300*a* may be disposed in a building 10 while another terminal 300*b* and the server 500 may be located outside the building 10.

The plurality of cleaners 100*a* and 100*b* are cleaners that perform cleaning while traveling by themselves, and may perform autonomous traveling and autonomous cleaning. Each of the plurality of cleaners 100*a* and 100*b* may include a communication unit 1100, in addition to the traveling function and the cleaning function.

The plurality of cleaners 100*a* and 100*b*, the server 500 and the plurality of terminals 300*a* and 300*b* may be connected together through the network 50 to exchange data. To this end, although not shown, a wireless router such as an access point (AP) device and the like may further be provided. In this case, the terminal 300*a* located in the building (internal network) 10 may access at least one of the plurality of cleaners 100*a* and 100*b* through the AP device so as to perform monitoring, remote control and the like with respect to the cleaner. Also, the terminal 300*b* located in an external network may access at least one of the plurality of cleaners 100*a* and 100*b* through the AP device, to perform monitoring, remote control and the like with respect to the cleaner.

The server 500 may be wirelessly connected directly through the terminal 300*b*. Alternatively, the server 500 may be connected to at least one of the plurality of cleaners 100*a* and 100*b* without passing through the mobile terminal 300*b*.

The server 500 may include a programmable processor and may include various algorithms. By way of example, the server 500 may be provided with algorithms related to performing machine learning and/or data mining. As an example, the server 500 may include a speech recognition algorithm. In this case, when receiving voice data, the received voice data may be output by being converted into data in a text format.

The server 500 may store firmware information, operation information (course information and the like) related to the plurality of cleaners 100*a* and 100*b*, and may register product information regarding the plurality of cleaners 100*a* and 100*b*. For example, the server 500 may be a server operated by a cleaner manufacturer or a server operated by an open application store operator.

In another example, the server 500 may be a home server that is provided in the internal network 10 and stores status information regarding the home appliances or stores contents shared by the home appliances. If the server 500 is a home server, information related to foreign substances, for example, foreign substance images and the like may be stored.

Meanwhile, the plurality of cleaners 100*a* and 100*b* may be directly connected to each other wirelessly via ZIGBEE®, Z-WAVE®, BLUETOOTH®, Ultra-wide band, and the like. In this case, the plurality of cleaners 100*a* and 100*b* may exchange position information and traveling information with each other.

At this time, any one of the plurality of cleaners 100*a* and 100*b* may be a master cleaner 100*a* and another may be a slave cleaner 100*b*.

In this case, the first cleaner 100*a* may control traveling and cleaning of the second cleaner 100*b*. In addition, the second cleaner 100*b* may perform traveling and cleaning while following up the first cleaner 100*a*. Here, the operation or action that the second cleaner 100*b* follows up the first cleaner 100*a* refers to that the second cleaner 100*b* performs traveling and cleaning while following up the first cleaner 100*a* with maintaining a proper distance from the first cleaner 100*a*.

Figure 5C:
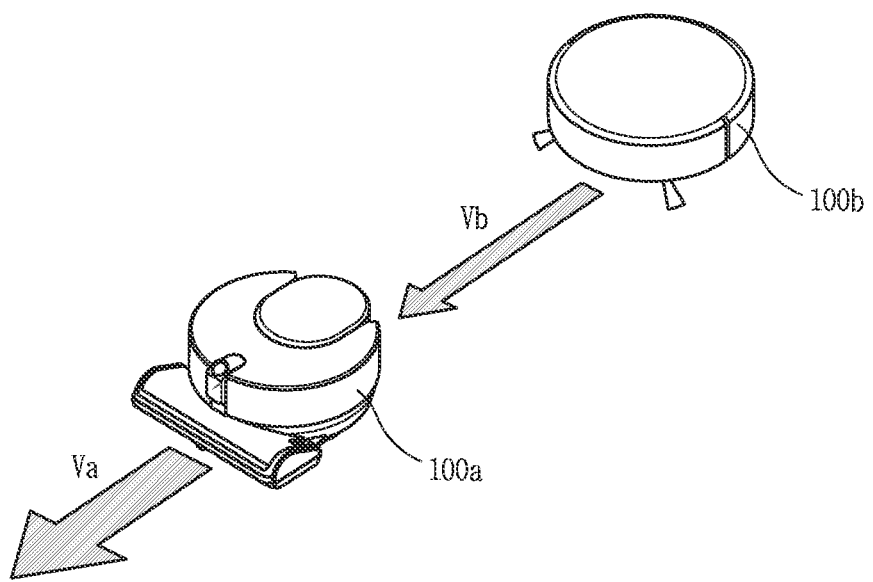
FIG. 5C is a conceptual view illustrating follow-up traveling of a plurality of autonomous mobile robots according to one embodiment of the present disclosure.

Referring to FIG. 5C, the first cleaner 100a controls the second cleaner 100b such that the second cleaner 100b follows up the first cleaner 100a.

For this purpose, the first cleaner 100a and the second cleaner 100b should exist in a specific area where they can communicate with each other, and the second cleaner 100b should recognize at least a relative position of the first cleaner 100a.

For example, the communication unit of the first cleaner 100a and the communication unit of the second cleaner 100b exchange IR signals, ultrasonic signals, carrier frequencies, impulse signals, and the like, and analyze them through triangulation, so as to calculate movement displacements of the first cleaner 100a and the second cleaner 100b, thereby recognizing relative positions of the first cleaner 100a and the second cleaner 100b. However, the present disclosure is not limited to this method, and one of the various wireless communication technologies described above may be used to recognize the relative positions of the first cleaner 100a and the second cleaner 100b through triangulation or the like.

When the first cleaner 100a recognizes the relative position with the second cleaner 100b, the second cleaner 100b may be controlled based on map information stored in the first cleaner 100a or map information stored in the server, the terminal or the like. In addition, the second cleaner 100b may share obstacle information sensed by the first cleaner 100a. The second cleaner 100b may perform an operation based on a control command (for example, a control command related to a traveling direction, a traveling speed, a stop, etc.) received from the first cleaner 100a.

Specifically, the second cleaner 100b performs cleaning while traveling along a traveling path of the first cleaner 100a. However, the traveling directions of the first cleaner 100a and the second cleaner 100b do not always coincide with each other. For example, when the first cleaner 100a moves or rotates up/down/right/left, the second cleaner 100b may move or rotate up/down/right/left after a predetermined time, and thus current advancing directions of the first and second cleaners 100a and 100b may differ from each other.

Also, a traveling speed Va of the first cleaner 100a and a traveling speed Vb of the second cleaner 100b may be different from each other.

The first cleaner 100a may control the traveling speed Vb of the second cleaner 100b to be varied in consideration of a distance at which the first cleaner 100a and the second cleaner 100b can communicate with each other. For example, if the first cleaner 100a and the second cleaner 100b move away from each other by a predetermined distance or more, the first cleaner 100a may control the traveling speed Vb of the second cleaner 100b to be faster than before. On the other hand, when the first cleaner 100a and the second cleaner 100b move close to each other by a predetermined distance or less, the first cleaner 100a may control the traveling speed Vb of the second cleaner 100b to be slower than before or control the second cleaner 100b to stop for a predetermined time. Accordingly, the second cleaner 100b can perform cleaning while continuously following up the first cleaner 100a.

The first autonomous cleaner 100a of the present disclosure may be referred to as a first robot cleaner or a first cleaner 100a and the second autonomous cleaner 100b may be referred to as a second robot cleaner or a second cleaner 100b.

In this specification, the first autonomous cleaner 100a will be referred to as a first cleaner 100a and the second autonomous cleaner 100b will be referred to as a second cleaner 100b.

The first and second cleaners 100a and 100b may perform traveling and cleaning in a following manner without user's intervention.

To this end, it is necessary that the first cleaner 100a recognizes the position of the second cleaner 100b or the second cleaner 100b recognizes the position of the first cleaner 100a. This may mean that the relative positions of the first cleaner 100a and the second cleaner 100b must be determined.

The present disclosure can grasp the relative positions of the first cleaner 100a and the second cleaner 100b by using various methods.

For example, the communication unit of the first cleaner 100a and the communication unit of the second cleaner 100b exchange IR signals, ultrasonic signals, carrier frequencies, impulse signals, and the like, and recognize the relative positions of the first cleaner 100a and the second cleaner 100b through triangulation using the exchanged signals.

In addition, the present disclosure can recognize the relative positions of the first cleaner 100a and the second cleaner 100b through triangulation using one of the various wireless communication technologies described above (e.g., ZIGBEE®, Z-WAVE®, BLUETOOTH® and Ultra-wide Band).

Since the triangulation method for obtaining the relative positions of the two devices is a general technique, a detailed description thereof will be omitted in this specification.

In the plurality of autonomous cleaners according to one embodiment of the present disclosure, the relative positions of the first cleaner and the second cleaner may be determined (recognized) by using the UWB module.

As described above, the UWB module (or UWB sensor) may be included in the communication units 1100 of the first cleaner 100a and the second cleaner 100b. In view of the fact that the UWB modules are used to sense the relative positions of the first cleaner 100a and the second cleaner 100b, the UWB modules may be included in the sensing units 1400 of the first cleaner 100a and the second cleaner 100b.

The first cleaner 100a may include a transmitting UWB module 700a for transmitting ultra-wideband (UWB) signals. The transmitting UWB module may be termed as a second type transmitting sensor or a UWB tag.

The second cleaner 100b may include a receiving UWB module 700b for receiving the UWB signals output from the transmitting UWB module 700a provided in the first cleaner 100a. The receiving UWB module may be named as a second type receiving sensor or a UWB anchor.

UWB signals transmitted/received between the UWB modules may be smoothly transmitted and received within a specific space.

Accordingly, even if an obstacle exists between the first cleaner 100a and the second cleaner 100b, if the first cleaner 100a and the second cleaner 100b exist within a specific space, they can transmit and receive the UWB signals. This may mean that accuracy is increased.

The first cleaner and the second cleaner according to the present disclosure can measure time of each signal transmitted and received between the UWB tag and the UWB anchor to recognize a distance (spaced distance) between the first cleaner and the second cleaner.

For example, as shown in FIG. 7B, the control unit 1800 of the second cleaner 100*b* may output a first signal (Radio message 1) at the UWB anchor of the second cleaner.

The first signal may be received in the UWB tag of the first cleaner 100*a*.

The control unit 1800 of the first cleaner 100*a* may output a second signal (Radio message 2) in response to the reception of the first signal.

The control unit 1800 of the second cleaner 100*b* may receive the second signal through the UWB anchor 700*b*.

The second signal may include delay time (t_reply) information which is calculated based on a time at which the first cleaner 100*a* has received the first signal and a time at which the first cleaner 100*a* has output the second signal.

The control unit of the second cleaner 100*b* may calculate a signal transmission time, namely, Time of Flight (ToF) between the first cleaner and the second cleaner using an output time t1 of the first signal, a received time t2 of the second signal, and the delay time t_reply included in the second signal.

The control unit 1800 of the second cleaner 100*b* may calculate a distance between the first cleaner 100*a* and the second cleaner 100*b* (accurately, a distance between the UWB tag and the UWB anchor) using the output time t1 of the first signal, the received time t2 of the second signal, and the delay time t_reply included in the second signal. Here, c in FIG. 7B denotes speed of light.

Specifically, the first cleaner 100*a* calculates a first value which is obtained by subtracting a received time of the second signal and the delay time included in the second signal from an output time of the first signal.

Thereafter, the first cleaner 100*a* may calculate the distance between the first cleaner 100*a* and the second cleaner 100*b* by multiplying the speed c of light by a value, which is obtained by dividing the first value by 2.

Meanwhile, the present disclosure can perform collaborative cleaning using a plurality of autonomous cleaners. Here, the cooperative cleaning may mean that a plurality of autonomous cleaners takes charge of different areas, respectively, and clean the areas in charge.

At this time, the plurality of autonomous cleaners may perform the cleaning for the areas in charge simultaneously or with a predetermined time difference.

The related art has employed a method in which a plurality of autonomous cleaners shares map information to perform collaborative cleaning.

Here, performing the collaborative cleaning by using the method sharing the map information may mean that the collaborative cleaning is performed in a manner of sharing one map information by the plurality of autonomous cleaners, updating an area cleaned by each cleaner in the map information, and determining areas to be cleaned by the plurality of autonomous cleaners, respectively, by sharing the updated map information.

In this manner, in order to use the method in which the plurality of autonomous cleaners shares map information, the plurality of autonomous cleaners must have the same specification, and have the same obstacle detection and position-recognition sensors, which causes an increase in costs.

On the other hand, the present disclosure can provide a plurality of autonomous cleaners that a first cleaner determines a relative position of a second cleaner using radio waves and performs collaborative cleaning (segment cleaning) based on the determined relative position without map sharing.

Hereinafter, a control method for performing collaborative cleaning without map sharing by a plurality of autonomous cleaners will be described in detail, with reference to the accompanying drawings.

Figure 6:
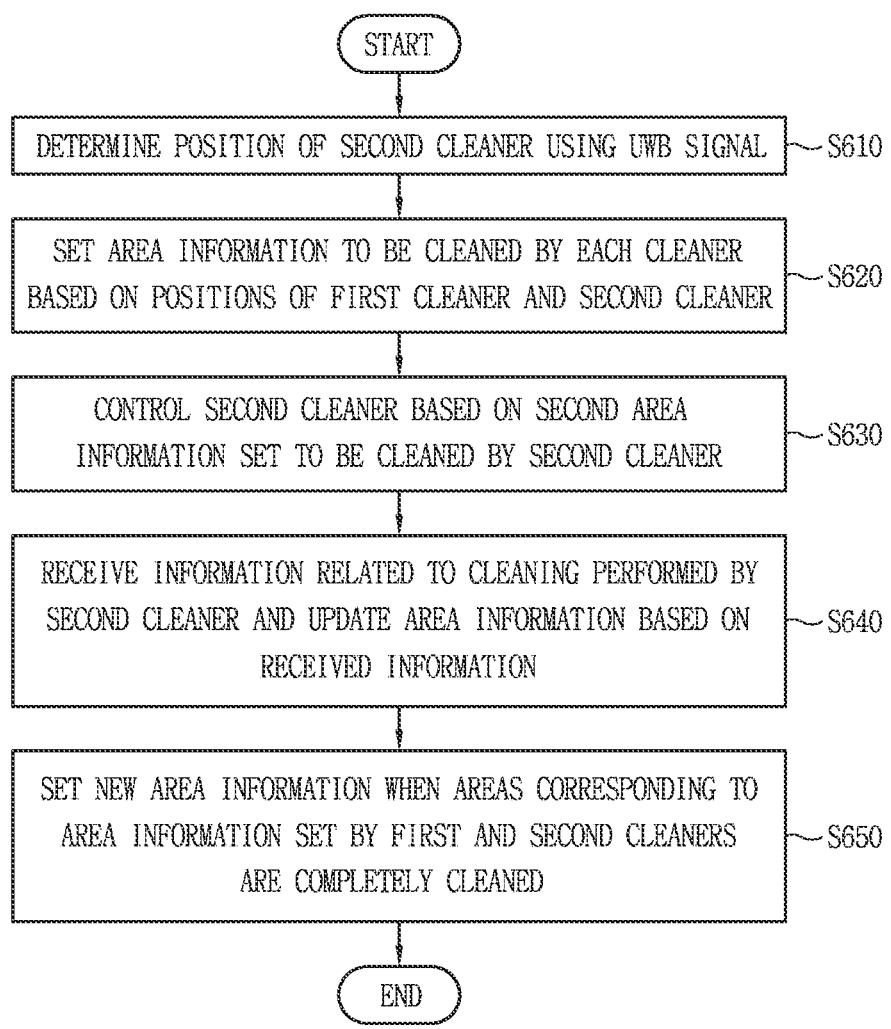
FIG. 6 is a flowchart illustrating a representative control method according to the present disclosure.
Figure 7:
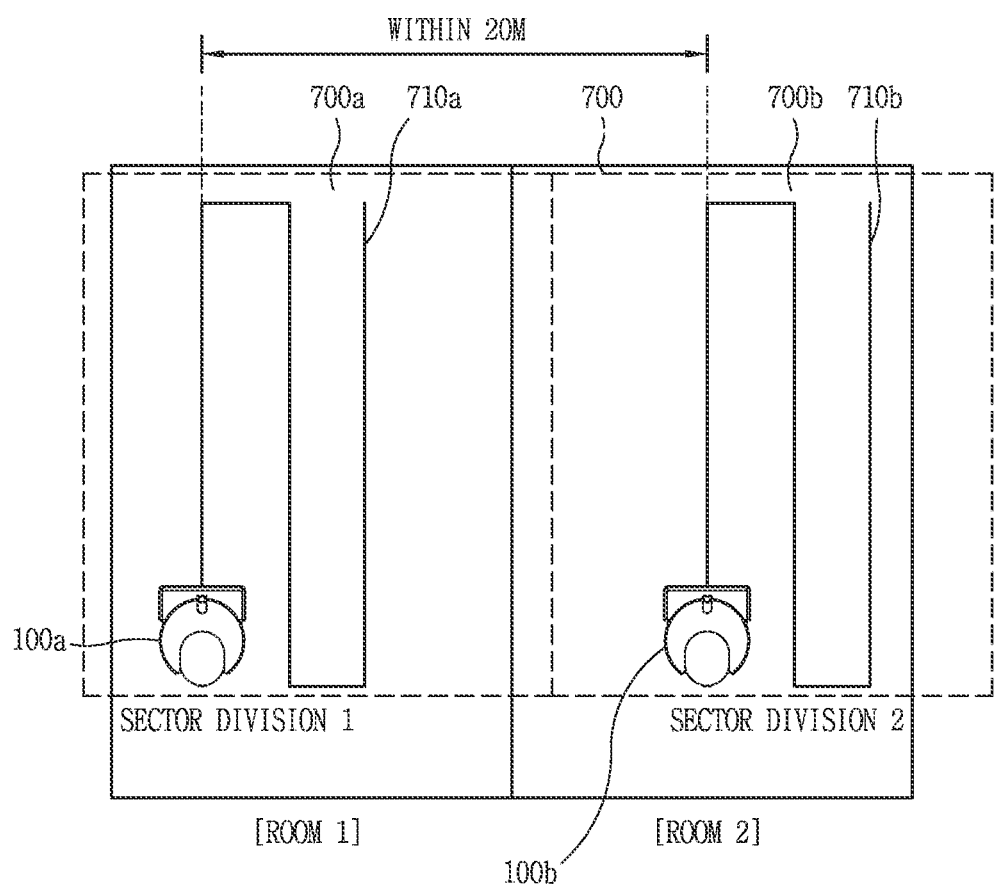
FIGS. 7 and 8 are conceptual views illustrating the control method illustrated in FIG. 6.
Figure 8:
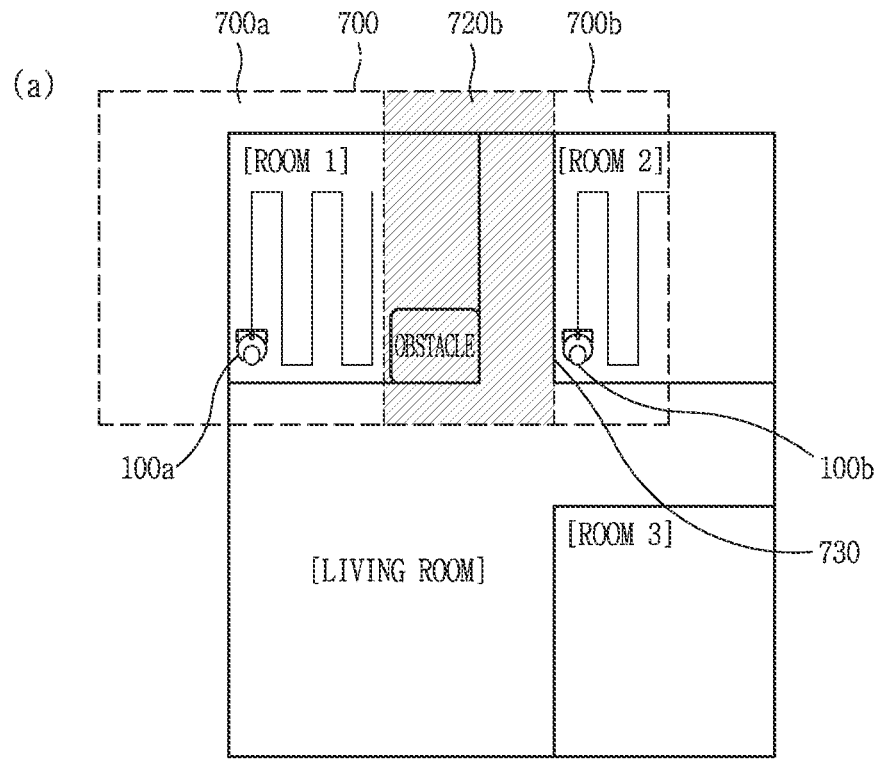
Figure 8:
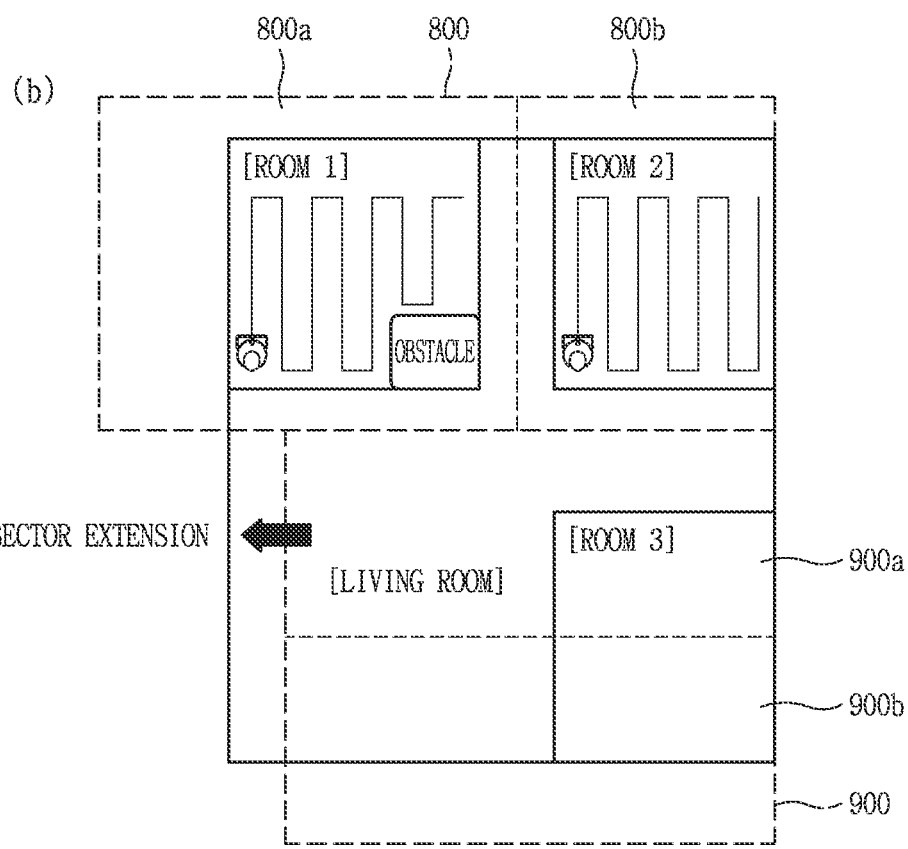

FIG. 6 is a flowchart illustrating a representative control method according to the present disclosure, and FIGS. 7 and 8 are conceptual views illustrating the control method illustrated in FIG. 6.

First, the present disclosure may include a plurality of autonomous cleaners, and the plurality of autonomous cleaners may include a first cleaner 100*a* and a second cleaner 100*b*.

In this specification, it is assumed that information for collaborative cleaning is generated/updated only by the first cleaner 100*a* and the second cleaner 100*b* is controlled by the first cleaner 100*a*.

The first cleaner 100*a* of the plurality of autonomous cleaners of the present disclosure may include a traveling unit for moving its main body and a communication unit for performing communication with the second cleaner 100*b*. The second cleaner 100*b* may include a traveling unit for moving its main body and a communication unit for performing communication with the first cleaner 100*b*.

The first cleaner 100*a* of the present disclosure may determine the relative position of the second cleaner 100*b* using radio waves.

For example, the radio wave may be an ultra-wideband signal (UWB signal) or a Bluetooth BLUETOOTH® low energy (BLE) signal which can be output from the communication unit (or the sensing unit).

In this specification, it is assumed that the radio wave is a UWB signal.

The first cleaner 100*a* and the second cleaner 100*b*, as aforementioned, may include a UWB module. For example, the first cleaner 100*a* may include a UWB tag, and the second cleaner 100*b* may include a UWB anchor.

Referring to FIG. 6, the control unit of the first cleaner 100*a* may determine (recognize) the position of the second cleaner using a UWB signal (S610). The method in which the first cleaner 100*a* determines the relative position of the second cleaner 100*b* using the UWB signal will be understood by the foregoing description.

Thereafter, the control unit of the first cleaner 100*a* may set area information to be cleaned by each cleaner, based on the positions of the first cleaner and the second cleaner (S620).

For example, the control unit of the first cleaner 100*a*, as illustrated in FIG. 7, may set area information 700 to be cleaned by each cleaner, based on the position of the first cleaner 100*a* and the position of the second cleaner 100*b* (or relative positions of the first cleaner and the second cleaner).

The area information 700 may also be referred to as a sector or sector information.

The area information 700 may be divided into area information in which the first cleaner 100*a* performs cleaning and area information in which the second cleaner 100*b* performs cleaning.

That is, the area information 700 includes first area information 700*a* in which the first cleaner 100*a* performs cleaning, and second area information 700*b* in which the second cleaner 100*b* performs cleaning.

The area information 700, for example, may be generated, in response to the first cleaner 100*a* determining the position of the second cleaner 100*b*. That is, the control unit of the first cleaner 100*a* may determine the position of the second cleaner 100*b* based on transmission/reception of the UWB signals to/from the second cleaner 100*b* through the communication unit, and generate the area information 700 based on the determined position of the second cleaner.

The area information 700 may have an arbitrary shape, and the shape of the area information 700 may be pre-decided when a product is created. Also, the area information 700 may be changed by user setting.

The first area information 700a and the second area information 700b included in the area information 700 may be decided on the basis of position information between the first cleaner and the second cleaner, or pre-decided when the product is manufactured.

The control unit of the first cleaner 100a may control the second cleaner based on the second area information 700b which is to be cleaned by the second cleaner 100b (S630).

Specifically, when the position of the second cleaner 100b is determined, the control unit of the first cleaner 100a may determine the first area information 700a in which the first cleaner 100a is to perform cleaning and the second area information 700b in which the second cleaner 100b is to perform cleaning, and transmit a control command for controlling the second cleaner 100b to clean an area corresponding to the second area information 700b, to the second cleaner 100b through the communication unit.

The second cleaner 100b may perform cleaning in the area corresponding to the second area information 700b based on the control command. In other words, the control unit of the first cleaner 100a may control the communication unit so that the second cleaner 100b performs cleaning in the area corresponding to the second area information 700b.

Also, the control unit of the first cleaner 100a may perform cleaning in an area corresponding to the first area information 700a in which the first cleaner 100a is to perform cleaning.

The control unit of the first cleaner 100a may control the first cleaner 100a to perform cleaning within the area corresponding to the first area information 700a while maintaining a preset distance (e.g., 20 m) or less from the second cleaner 100b.

The preset distance, for example, may mean an available distance in which the first cleaner 100a can recognize the position of the second cleaner 100b using the UWB signal.

The preset distance may be determined based on the specifications of the communication units (specifically, the specifications of the UWB modules) provided in the first and second cleaners 100a and 100b, and may vary according to user settings.

The control unit of the first cleaner 100a may determine the position of the second cleaner 100b using the UWB signal in real time. For this purpose, the control unit of the first cleaner 100a may control the first cleaner 100a to keep traveling within the preset distance from the second cleaner 100b for transmission/reception of the UWB signal to/from the second cleaner 100b.

When the distance between the first cleaner 100a and the second cleaner 100b becomes longer than the preset distance, the first cleaner 100a may transmit a control command for stopping traveling of the second cleaner 100b to the second cleaner 100b through the communication unit.

In this case, the second cleaner 100b may stop traveling based on the control command, and restart traveling for cleaning when the UWB signal is transmitted and received again to and from the first cleaner 100a.

Meanwhile, the control unit of the first cleaner 100a may receive information related to the cleaning performed by the second cleaner using the UWB signal, and may update the area information 700 based on the received information (S640).

Specifically, the control unit of the first cleaner 100a may determine (acquire) information related to the cleaning performed by the second cleaner 100b using the UWB signal.

The information related to the cleaning performed by the second cleaner 100b may include at least one of a traveling path along which the second cleaner 100b performs cleaning, obstacle information sensed by the second cleaner 100b, and information on whether or not the second cleaner 100b can continue to perform cleaning.

The information related to the cleaning performed by the second cleaner 100b may also be transmitted from the second cleaner 100b to the first cleaner 100a through the communication unit, instead of the UWB signal.

For example, the control unit of the first cleaner 100a, as illustrated in FIG. 7, may recognize the relative position of the second cleaner 100b in real time (or at predetermined time intervals) in the area 700 corresponding to the second area information 700b, and determine (recognize) a traveling path 710b of the second cleaner 100b.

The control unit of the first cleaner 100a may sense the traveling path 710b of the second cleaner 100b using the UWB signal and reflect the sensed traveling path 710b of the second cleaner 100b to the second area Information 700b.

The control unit of the first cleaner 100a may receive information related to whether or not cleaning can be continued from the second cleaner 100b through the communication unit, when the second cleaner 100b has completed the cleaning of the area corresponding to the second area information 700b along the sensed traveling path 710b of the second cleaner 100b.

The control unit of the first cleaner 100a may transmit information for asking whether or not cleaning can be continued to the second cleaner 100b when the second cleaner has completely traveled along the traveling path 710b to correspond to the second area information 700b.

In this case, the second cleaner 100b may determine (or detect) through the sensing unit whether or not it can further travel except for the path on which it has completely traveled.

In the case where further traveling is possible, the second cleaner 100b may transmit information indicating that it can continue to perform cleaning to the first cleaner 100a through the communication unit.

If further traveling is impossible, the second cleaner 100b may transmit information indicating that the cleaning cannot be continued to the first cleaner 100a through the communication unit.

The control unit of the first cleaner 100a may change the area information 700, which has been initially set, when receiving the information indicating that the cleaning can be continued from the second cleaner 100b.

Thereafter, the control unit of the first cleaner 100a may continue the cleaning of the second cleaner 100b based on the changed area information.

For example, as illustrated in (a) of FIG. 8, the control unit of the first cleaner 100a may determine whether or not the second cleaner 100b has completely cleaned the area corresponding to the second area information 700b by reflecting the traveling path of the second cleaner 100b to the second area information 700b.

In this case, when the second cleaner 100b has no choice but to travel back along the traveling path that has already traveled because there is no area to move further, the first cleaner 100a may transmit information for asking whether or not cleaning can be continued to the second cleaner 100b.

If information that the cleaning can be continuously performed is received from the second cleaner 100*b*, it means that the cleaning of the second cleaner 100*b* is not completed.

If information that the cleaning cannot be continued is received from the second cleaner in the state where the second cleaner 100*b* has no area to further move except for traveling back along the already-traveled traveling path in the second area information 700*b*, the control unit of the first cleaner 100 may determine that the cleaning of the second cleaner 100*b* has been completed.

On the other hand, the control unit of the first cleaner 100*a* may determine an area 720*b* that the second cleaner 100*b* has not traveled in the second area information 700*b*.

The first cleaner 100*a* may request information related to cleaning from the second cleaner 100*b* when the second cleaner 100*b* has no area to further move except for moving back along the previously-traveled traveling path in the second area information 700*b*, and determine whether or not cleaning for the area 720*b* is possible based on the information related to the cleaning, received from the second cleaner 100*b*.

For example, the information related to the cleaning may include information that the second cleaner 100*b* cannot enter the area 720*b* due to a wall 730 (or an obstacle).

The control unit of the first cleaner 100*a* may change the area 720*b* to the first area information in which the first cleaner 100*a* performs cleaning when the cleaning-related information includes information that the second cleaner 100*b* cannot clean the area 720*b*. In this case, the first area information in which the first cleaner is to perform cleaning may be increased.

On the other hand, the control unit of the first cleaner 100*a* may change the second area information 700*b* to be increased upon receiving the information that cleaning can be continued from the second cleaner.

As illustrated in (b) of FIG. 8, the control unit of the first cleaner 100*a* may change the second area information 700*b* to be increased and control the second cleaner 100*b* to continuously perform cleaning based on the changed area information 700*b*.

Similarly, when the first area information is changed, the control unit of the first cleaner 100*a* may control the traveling unit so that the first cleaner 100*a* cleans an area corresponding to the changed first area information 800*a*.

On the other hand, as illustrated in (b) of FIG. 8, when information that cleaning cannot be continued is received from the second cleaner 100*b* after the second cleaner 100*b* has completed cleaning for the area corresponding to the second area information 700*b* or 800*b*, the control unit of the first cleaner 100*a* may determine whether or not cleaning for the area corresponding to the first area information 700*a* or 800*a* has been completed by the first cleaner 100*a*.

Similarly, the control unit of the first cleaner 100*a* may sense (determine) a traveling path along which its main body moves (i.e., a traveling path of the first cleaner) through the traveling unit, and reflect the traveling path of the first cleaner in the first area information.

The control unit of the first cleaner 100*a* may determine that cleaning for the first area information 700*a*, 800*a* has been completed when the first cleaner 100*a* has no area to further move except for returning along the previously-moved traveling path in the first area information 700*a*.

On the other hand, if it is determined through the sensing unit that the first cleaner 100*a* can continue cleaning, the control unit of the first cleaner 100*a* may change (reset) the area information 700 to extend the first area information 700*a*. On the other hand, when information that cleaning cannot be continued is received from the second cleaner 100*b* after the second cleaner 100*b* has completed cleaning for the area corresponding to the second area information 700*b* or 800*b*, the control unit of the first cleaner 100*a* may determine whether or not cleaning for the area corresponding to the first area information 700*a* or 800*a* has been completed by the first cleaner 100*a*.

The control unit of the first cleaner 100*a* may control the communication unit so that the second cleaner 100*b* waits (is paused) when the first cleaner 100*a* is currently cleaning the area corresponding to the first area information 700*a* or 800*a*.

On the other hand, the control unit of the first cleaner 100*a* may set new area information 900 not to overlap the existing area information 700 or 800 when the first cleaner 100*a* has completed cleaning for the area corresponding to the first area information 700*a* or 800*a* and the second cleaner 100*b* has completed cleaning for the area corresponding to the second area information 700*b* or 800*b* (S650).

Afterwards, the control unit of the first cleaner 100*a* may transmit a control command for moving the second cleaner 100*b* to an area (space) corresponding to the second area information 900*b* included in the new area information 900, to the second cleaner 100*b* through the communication unit.

The control unit of the first cleaner 100*a* may control the traveling unit to move the first cleaner 100*b* to the area (space) corresponding to first area information 900*a* included in the new area information 900.

If the first cleaner is located in the new first area information 900*a* and the second cleaner is located in new second area information 900*b*, collaborative cleaning can be performed by applying the aforementioned method in the similar/same manner.

Also, the control unit of the first cleaner 100*a* may generate map information on a space, in which cleaning is performed, using the traveling path of the first cleaner and the traveling path of the second cleaner.

Thereafter, when a separate map information request is received from the second cleaner 100*b*, the control unit of the first cleaner may transmit the generated map information to the second cleaner 100*b* through the communication unit.

As described above, according to the present disclosure, in a state where a first cleaner and a second cleaner do not share map information, the first cleaner can determine a relative position of the second cleaner, and set/change first and second area information (or sectors) based on the determined relative position, thereby enabling collaborative cleaning of the first and second cleaners.

On the other hand, when the first cleaner and the second cleaner are not located within a distance in which they can transmit and receive UWB signals, the first cleaner cannot determine the relative position of the second cleaner.

In order to solve this problem, when the first cleaner and the second cleaner are not positioned within a preset distance in which they can transmit and receive the UWB signals, the control unit of the first cleaner 100*a* may transmit a control command for starting cleaning of the second cleaner 100*b* to the second cleaner 100*b* through the communication unit. In this case, the second cleaner 100*b* may move while performing cleaning.

In addition, the control unit of the first cleaner 100*a* may transmit the UWB signal at predetermined intervals while controlling the traveling unit to move the first cleaner 100*a*.

If the distance between the first cleaner 100*a* and the second cleaner 100*b* becomes shorter than the preset distance due to the movement of the first cleaner 100*a* and the second cleaner 100b, the first cleaner 100a and the second cleaner 100b may transmit and receive the UWB signals.

In this case, the first cleaner 100a may receive a UWB signal transmitted from the second cleaner 100b which is responsive to a UWB signal transmitted by it. In this case, the first cleaner 100a may determine that the first cleaner and the second cleaner are located within the preset distance. Further, the position of the second cleaner may be determined.

The control unit of the first cleaner 100a may perform the cooperative cleaning by using the control method described with reference to FIGS. 6 to 8, in response to the reception of the UWB signal.

According to the present disclosure, in case of cleaning divided areas using a plurality of autonomous cleaners, a first cleaner can perform cleaning by controlling a second cleaner even without sharing a map. Therefore, collaborative cleaning using the plurality of autonomous cleaners can be performed even though the plurality of autonomous cleaners is different in specification.

According to the present disclosure, a first cleaner, of a plurality of autonomous cleaners, can update map information (or area information in which each cleaner has to perform cleaning) by recognizing or determining a relative position of a second cleaner and a cleaning state of the second cleaner, and can control the second cleaner by using the updated map information. Therefore, optimized collaborative cleaning can be performed using the plurality of autonomous cleaners even without map sharing.

The present disclosure described above can be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 1800. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

What is claimed is:

1. An autonomous cleaner, as a first cleaner of a plurality of autonomous cleaners, comprising:
    a traveling unit configured to move a main body;
    a communication unit configured to communicate with a second cleaner; and
    a controller configured to:
        determine a position of the second cleaner using an Ultra-WideBand (UWB) signal output from the communication unit,
        set area information, in which the first and second cleaners are to perform cleaning, based on a position of the first cleaner and the position of the second cleaner,
        control the second cleaner based on second area information in which the second cleaner is to perform cleaning,
        receive information on whether or not cleaning can be continued, from the second cleaner through the communication unit, when the second cleaner has completed the cleaning of the area corresponding to the second area information along the sensed traveling path of the second cleaner,
        set new area information not to overlap the second area information when the information that cleaning can be continued is received from the second cleaner, and
        control the second cleaner to continue the cleaning of the second cleaner based on the set new area information.

2. The autonomous cleaner of claim 1, wherein the controller is further configured to control the communication unit so that the first cleaner performs cleaning in an area corresponding to first area information, in which the first cleaner is to perform cleaning, and the second cleaner performs cleaning in an area corresponding to the second area information.

3. The autonomous cleaner of claim 2, wherein the controller is further configured to control the first cleaner to perform cleaning within the area corresponding to the first area information while maintaining a preset distance between the first cleaner and the second cleaner.

4. The autonomous cleaner of claim 1, wherein the controller is further configured to:
    receive information related to cleaning performed by the second cleaner using the UWB signal, and
    update the area information based on the received information.

5. The autonomous cleaner of claim 4, wherein the controller is further configured to:
    sense a traveling path of the second cleaner using the UWB signal, and
    reflect the sensed traveling path of the second cleaner in the second area information.

6. The autonomous cleaner of claim 1, wherein the controller is further configured to determine whether or not the first cleaner has completed the cleaning for the area corresponding to the first area information when information that cleaning cannot be continued is received from the second cleaner after the second cleaner has completed the cleaning for the area corresponding to the second area information.

7. The autonomous cleaner of claim 6, wherein the controller is further configured to control the second cleaner to wait when the first cleaner is cleaning the area corresponding to the first area information.

8. The autonomous cleaner of claim 6, wherein the controller is further configured to set new area information not to overlap existing area information when the first cleaner has completed the cleaning for the area corresponding to the first area information and the second cleaner has completed the cleaning for the area corresponding to the second area information.

* * * * *